May 23, 1933.   P. F. HANNIGAN   1,911,130
SMOKE DETECTOR
Filed Aug. 27, 1930
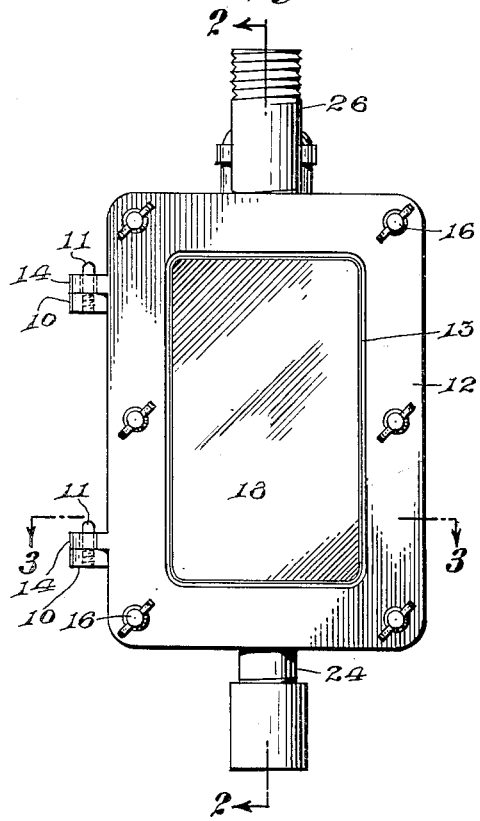
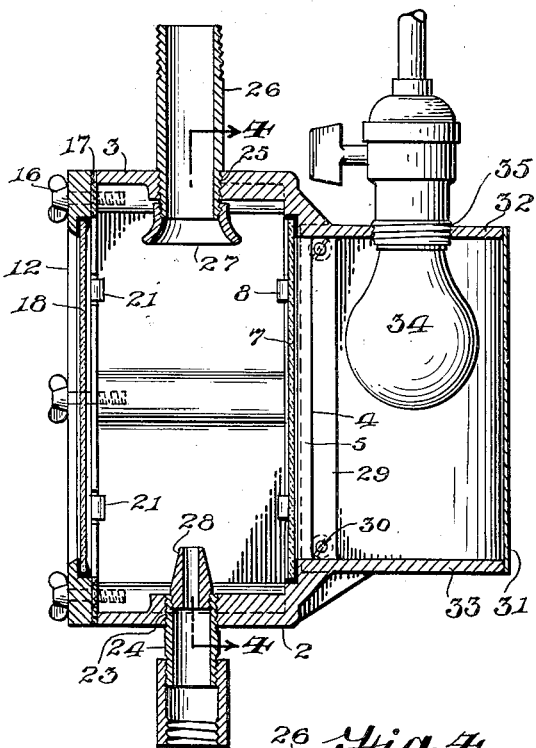
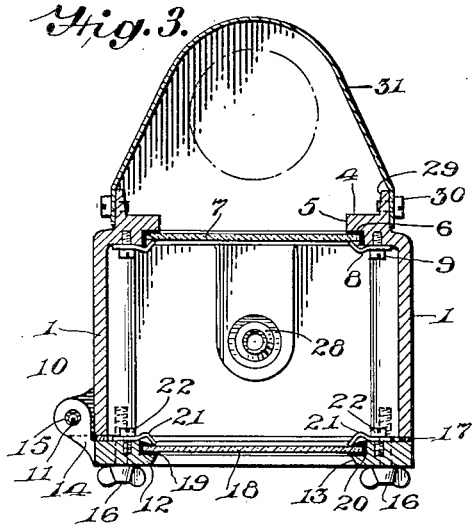
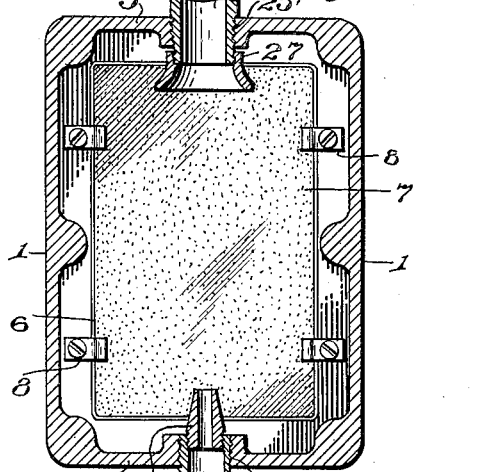
INVENTOR
Philip F. Hannigan,
By J. Stuart Freeman.
Attorney Patented May 23, 1933

1,911,130

UNITED STATES PATENT OFFICE

PHILIP F. HANNIGAN, OF PHILADELPHIA, PENNSYLVANIA

SMOKE DETECTOR

Application filed August 27, 1930. Serial No. 478,019.

The object of the invention is to provide improvements in smoke detectors, and especially in a device for this purpose which is of compact form, economical and efficient operation, and which is both positive in its indication and does not affect the operation of the drafts of the furnace, still, retort, or other device with which it may be associated.

Another object is to provide a device of this character, comprising a chamber into, through and from which a current of smoke-carrying air is adapted to pass between an illuminated frosted or opalescent surface and a transparent window, through which latter the interior of the device is at all times visible.

With these and other objects in mind, the present invention comprises further details of construction and operation which are fully brought out in the following description, when read in conjunction with the accompanying drawing, in which Fig. 1 is a front elevational view of one embodiment of the invention; Fig. 2 is a vertical section on the line 2—2 of Fig. 1; Fig. 3 is a horizontal section on the line 3—3 of Fig. 1; and Fig. 4 is a transverse vertical section of the device along the line 4—4 of Fig. 2.

Referring to the drawing, a casing comprises side walls 1, bottom wall 2, and top wall 3, said walls being also connected by means of an inwardly directed substantially planular rear flange 4 surrounding an enlarged aperture 5. Said flange is provided with a peripheral groove 6 containing a gasket or other air-tight medium, against which a semi-transparent medium, such as opalescent glass 7, is secured by means of spaced preferably resilient fingers 8 upon the inner surface of said flange by means of screws 9.

The forward portion of said casing is preferably entirely open, and one of said side walls is provided with spaced lugs 10, supporting pivotal pins 11. A closure member comprising a frame 12, surrounding an enlarged aperture 13, is provided with lugs 14 having preferably enlarged apertures 15 to loosely receive said pivot pins, so that when said closure is in an inoperative position out of juxtaposition with respect to said casing walls, said pins form a support for said closure. However, when in substantially operative position adjacent to said casing walls, said closure frame can be drawn tightly against the forward edge portions of said walls by means of spaced wing nuts 16, an airtight union between said casing and said closure frame being insured by means of an interposed gasket 17. The aperture 13 of said closure is spanned by a preferably transparent medium 18 which is positioned in a peripheral groove 19 in said frame by means of a gasket or sealing medium 20, where it is held in place by spaced preferably yielding fingers 21, in turn secured to said closure frame by means of screws 22.

The bottom wall 2 of said casing is provided with a threaded aperture 23, with which is connected a tube 24 leading from an upper chamber in a furnace or other position where the possible presence of smoke is to be detected, and in thus referring to smoke detection, it is to be understood that this device is equally adapted to detect the presence of any visible gases which may arise from ovens, retorts, furnaces, or the like, of whatever character they may be.

The top wall 3 of said casing is similarly provided with a threaded aperture through which extends the threaded end portion of a pipe or tube 26, leading from said casing to a chimney or flue, the inwardly protruding end of said pipe 26 being preferably provided with a removable bell-shaped or similarly flared member 27. Thus the natural suction of the draft in such flue or chimney to which the pipe 26 is connected will draw smoke or other gas-laden air from a given locality through the pipe 24 and inwardly extending nozzle 28 into and through said casing between the transparent medium 18 and partially transparent medium 7 and thence through said first-named pipe 26 and up the stack, flue, or chimney.

The flange 4 of said casing is provided with a rearwardly extending pair of parallel flanges 29, to which are secured by any suitable means 30 the free edge portions of a hollow casing 31, closed at its upper and lower limits by means of integral extensions 32 and 33 of the top and bottom walls of said casing, 3 and 2, respectively. The inner surface of said casing 31 is preferably of light-reflecting characteristics, so that a source of light comprising an incandescent lamp 34 or the like extending thereinto through an aperture 35 in the upper closure wall 32, will cause light rays to be thrown against and partly through the partly transparent medium 7. In other words, this last named medium is illuminated without the presence of a glare, so that when one views a current of smoke or other visible gas or the like within said casing, the visibility thereof will be increased by this illuminated condition of the rear wall of the casing proper, especially after dark.

In considering this description of one embodiment of the invention as a basis for the appended claims, it is to be understood that the broad idea comprises the provision of means to conduct a current of smoke or visible gas through the atmosphere undisturbed by extraneous air currents and the like, against a background which makes such smoke or gas highly visible by contrast, whether said background is illuminated by light rays upon its surface or which may actually pass through it as herein described.

Having thus described my invention, what I claim and desire to protect by Letters Patent of the United States is:—

1. A smoke detector, comprising a hollow casing having an opening in one side, a transparent medium normally closing said opening, an opening in another side of said casing, a directly illuminated translucent medium closing said second opening and forming the rear wall of said casing, and inlet and outlet ports through which smoke may enter and leave said casing along a path extending transversely of the axis of said translucent medium, such smoke being visible within said casing in contrast with said illuminated translucent medium as a background.

2. A smoke detector, comprising a hollow casing providing a chamber having top, bottom and laterally opposite side walls, a transparent closure for the front of said casing, the rear portions of said walls terminating in inwardly directed flanges, said top and bottom walls being provided with rearwardly extending integral projections, a closure spanning the area between said side walls and said projections to provide an auxiliary compartment, a semi-transparent partition spanning said flanges and separating said chamber from said compartment, a source of light within said compartment, and inlet and outlet apertures in the said top and bottom walls to permit smoke to pass through said chamber so as to be viewed between said transparent closure and said partition when illuminated.

In testimony whereof I have affixed my signature.

PHILIP F. HANNIGAN.